United States Patent
Sip

(10) Patent No.: US 7,822,964 B2
(45) Date of Patent: Oct. 26, 2010

(54) BOOTING APPARATUS FOR BOOTING A COMPUTER AND METHOD THEREFOR AND COMPUTER WITH A BOOTING APPARATUS

(75) Inventor: Kim-Yeung Sip, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 714 days.

(21) Appl. No.: 11/766,090

(22) Filed: Jun. 20, 2007

(65) Prior Publication Data

US 2007/0300055 A1 Dec. 27, 2007

(30) Foreign Application Priority Data

Jun. 21, 2006 (CN) .................. 2006 1 0061247

(51) Int. Cl.
G06F 15/177 (2006.01)
(52) U.S. Cl. .................. 713/2; 713/1; 713/100
(58) Field of Classification Search .............. 713/1, 713/2, 100
See application file for complete search history.

(56) References Cited

U.S. PATENT DOCUMENTS

| | | | | |
|---|---|---|---|---|
| 5,887,163 A | | 3/1999 | Nguyen | |
| 6,795,912 B1 * | | 9/2004 | Itoh et al. | 713/2 |
| 7,234,055 B2 * | | 6/2007 | Chiu et al. | 713/2 |
| 7,240,188 B2 * | | 7/2007 | Takata et al. | 713/1 |
| 7,364,087 B2 * | | 4/2008 | Zimmer et al. | 235/492 |
| 7,440,808 B2 * | | 10/2008 | Koichi | 700/52 |
| 7,493,314 B2 * | | 2/2009 | Huang et al. | 1/1 |
| 2005/0015581 A1 | | 1/2005 | Chen | |
| 2006/0150037 A1 * | | 7/2006 | Wang | 714/100 |
| 2006/0236086 A1 * | | 10/2006 | Tsuji et al. | 713/2 |

OTHER PUBLICATIONS

Apple Computer Inc., Public Beta Software Enables Intel-based Macs to Run Windows XP, Apple Introduces Boot Camp, Apr. 5, 2006, Cupertino, California.

* cited by examiner

*Primary Examiner*—Nitin C Patel
(74) *Attorney, Agent, or Firm*—Winston Hsu; Scott Margo; Min-Lee Teng

(57) ABSTRACT

A method for booting a computer is provided. The computer includes a booting apparatus. The method includes the steps of: powering on the booting apparatus; generating a selection signal that indicates whether a first firmware or a second firmware is to be read; acquiring the selected firmware according to the selection signal; running the acquired firmware to power on and initialize a CPU and chipsets of the computer; indicating the CPU a data path of a corresponding OS according to the acquired firmware; loading the corresponding OS; receiving commands sent by the loaded OS; and indicating the CPU to execute the commands according to the acquired firmware. A related booting apparatus is also provided.

11 Claims, 2 Drawing Sheets

BOOTING APPARATUS FOR BOOTING A COMPUTER AND METHOD THEREFOR AND COMPUTER WITH A BOOTING APPARATUS

BACKGROUND

1. Technical Field

The present invention relates to a booting apparatus and a method therefor.

2. General Background

Operating system (OS) developers usually target specific hardware architecture for their OS to run on. But an OS that is not developed for a specific hardware architecture, is not operable on that hardware unless additional reconfigurations are performed. These additional reconfigurations allow the OS to recognize and control the hardware of the computer. Also, different operating systems (OS), which are develop based on the same hardware architecture, can be installed on the same computer hardware and users can choose the OS to be loaded. However, the OS developers of one Operating System may choose not to develop their OS for other hardware architecture and the user of that OS is confined to using one particular hardware architecture.

What is needed, therefore, is a booting apparatus and a method adapted for conveniently booting a computer so as to load an OS which is not developed based on hardware architecture of the computer.

SUMMARY

An apparatus for booting a computer is provided. The computer is equipped with a first OS and a second OS, wherein the first OS and the second OS are loaded by a first firmware and a second firmware respectively. The computer includes a CPU, chipsets, and a system bus. The apparatus includes a bus interface connecting to the system bus of the computer; a power management unit configured for powering on the OS booting apparatus; an input unit receiving operational inputs; and a micro control unit (MCU). The MCU includes a firmware selection module generating a selection signal that indicates whether the first firmware or the second firmware is to be read, according to the operational inputs through the input unit; a firmware acquiring module acquiring the selected firmware according to the selection signal; and a logic control module running the acquired firmware to power on and initialize the CPU and the chipsets of the computer, indicating the CPU a data path of a corresponding OS according to the acquired firmware, receiving commands sent by the loaded OS, and indicating the CPU to execute the received commands according to the acquired firmware.

A method for booting a computer is also provided. The method includes: powering on the apparatus; generating a selection signal that indicates whether a first firmware or a second firmware is to be read; acquiring the selected firmware; running the acquired firmware to power on and initialize a CPU and chipsets of the computer; indicating the CPU a data path of a corresponding OS according to the acquired firmware; loading the OS; receiving commands sent by the OS; and indicating the CPU to execute the commands according to the acquired firmware.

Other advantages and novel features will be drawn from the following detailed description with reference to the attached drawing.

DETAILED DESCRIPTION OF THE EMBODIMENT

Figure 1:
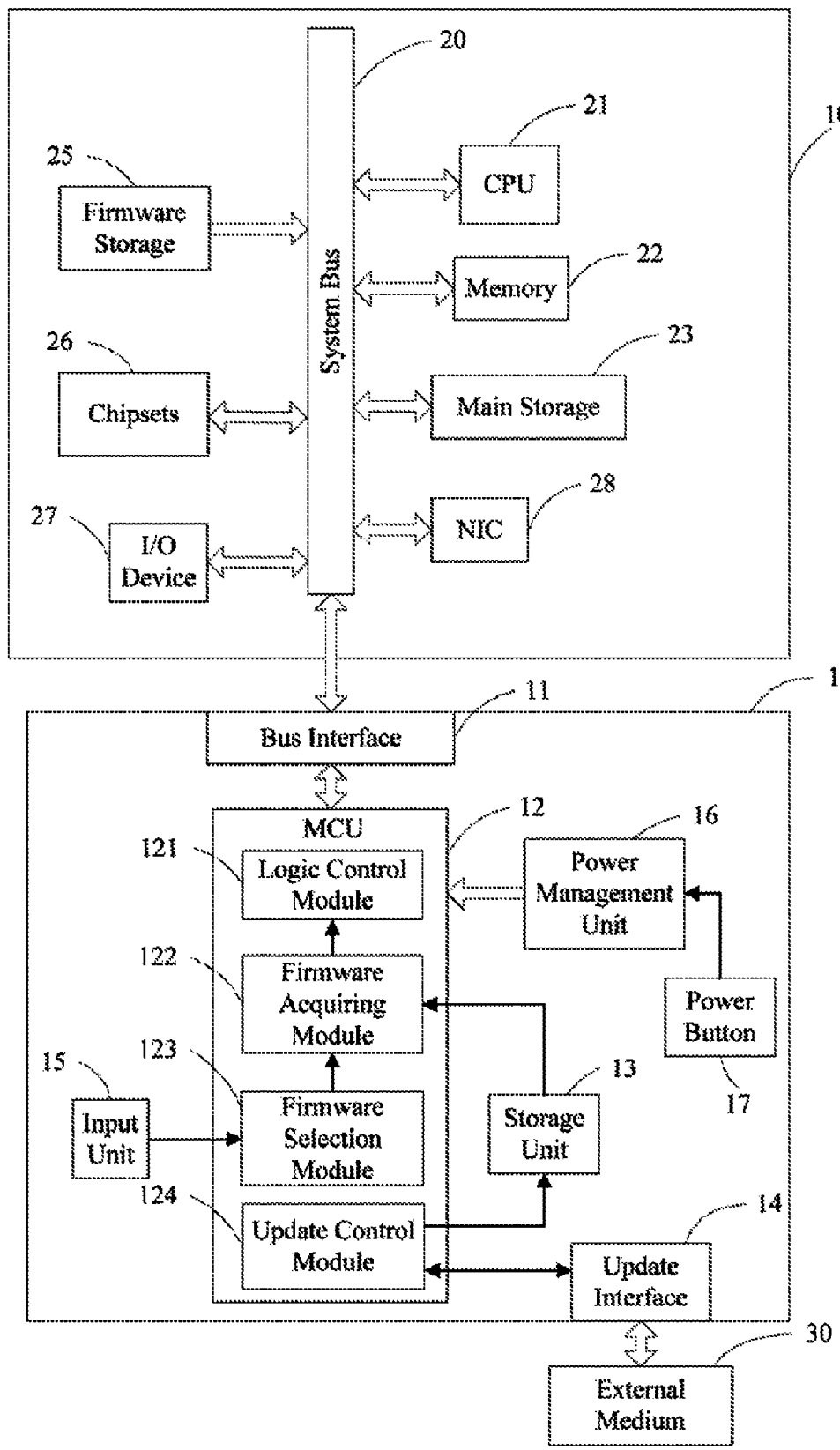
FIG. 1 is a schematic diagram of hardware infrastructure of a booting apparatus.

FIG. 1 is a schematic diagram of hardware infrastructure of a booting apparatus for booting a second OS in a predetermined computer system in accordance with a preferred embodiment of the present invention. A computer 100 that is preferably an Intel-based Apple computer is mainly configured with a CPU 21 (e.g., an Intel Core 2 duo CPU), a memory 22, a main storage 23, a firmware storage 25, chipsets 26 (e.g., north and south bridge chipsets, graphic chipset), I/O devices 27, and a system bus 20. The main storage 23, such as a magnetic disk drive, stores a first operating system and a second operating system. The first OS and the second OS are respectively designed and configured to optimally perform on a specific type of hardware architecture. For example, the first OS, e.g., Apple Mac OS X Tiger, operates on an Intel-based Apple computer, while the second OS, e.g., Microsoft Windows XP, operates on an Intel-based PC. Therefore, the second OS is not operable on the Intel-based Apple computer 100 unless additional reconfigurations are performed.

The firmware storage 25 stores a first firmware. The first firmware is programmed based on the hardware architecture of the computer 100 and the first OS, and is configured for initializing the chipsets 26 so as to boot the first OS. In this embodiment, the first firmware is programmed based on the Intel-based Apple computer and the Mac OS X Tiger.

A booting apparatus 1 (hereinafter "the apparatus 1") includes a bus interface 11, a micro control unit (MCU) 12, a storage unit 13, an update interface 14, an input unit 15, a power management unit 16, and a power button 17. The bus interface 11 is for connecting the apparatus 1 to the system bus 20 of the computer 100. The bus interface 11 can be, but not limited to, a Low Pin Count (LPC) Interface, a Peripheral Component Interface (PCI), an IEEE 1394 interface or a universal serial bus (USB) interface. The apparatus 1 can be formed either as a printed circuit board (PCB) with golden fingers thereon which can be plugged into a corresponding slot (e.g., PCI slot) on a motherboard of the computer 100; or as a peripheral with a connector (e.g., USB connector) which can be plugged into a corresponding socket on the computer 100.

The storage unit 13 stores a second firmware that is based on the hardware architecture of the computer 100 and the second OS. In this embodiment, the second firmware is programmed based on the hardware architecture of the Intel-based APPLE computer and WINDOWS XP. The second firmware controls the hardware of the Intel-based Apple computer with the WINDOWS XP. The input unit 15 is for receiving operational inputs from users. The input unit 15 can be a switch button on the apparatus 1 if the apparatus 1 is formed as a peripheral; or on a panel of a case of the computer 100 if the apparatus 1 is formed as a PCB plugged inside the case of the computer, and the output of the switch button is connected to the apparatus 1 (the PCB) through an extending wire. The power management unit 16 and the power button 17 are different from the computer standard power supply and power-on switch (not shown in FIG. 1) of the computer 100, the power management unit 16 is configured for powering on just the booting apparatus 1 according to the operational inputs through the power button 17.

The MCU 12 includes a logic control module 121, a firmware acquiring module 122, a firmware selection module 123, and an update control module 124. The firmware selection module 123 is for generating a selection signal that indicates which firmware (i.e., the first firmware and the second firmware) is to be read according to the operational inputs through the input unit 15. For example, when the operational input is a first OS selection, the firmware selection module 123 generates a first OS selection signal; similarly, when the operational input is a second OS selection, the firmware selection module 123 generates a second OS selection signal.

The firmware acquiring module 122 is for acquiring the selected firmware according to the selection signal (i.e., the first OS selection signal or the second OS selection signal). The logic control module 121 is for running the acquired firmware (i.e., the second firmware or the first firmware) to power on and initialize the CPU 21 and the chipsets 26 of the computer 100, and indicating the CPU 21 a data path of a corresponding OS according to the acquired firmware. After the corresponding OS is loaded, the logic control module 121 receives commands sent by the loaded OS, and indicates the CPU 21 to execute the commands according to the acquired firmware.

The update interface 14 is for connecting the apparatus 1 to an external medium 30, e.g., a computer or a network, and the update control module 124 is configured for updating the second firmware through the update interface 14 from the external medium 30.

In this preferred embodiment, the second OS is stored in the main storage 23. However, the second OS can also be stored in any other storage media, such as the storage unit 13 of the apparatus 1 if the capacity of the storage unit 13 is large enough, or the second OS can be acquired from a network connection through a NIC 28 (network interface card) of the computer 100.

Figure 2:
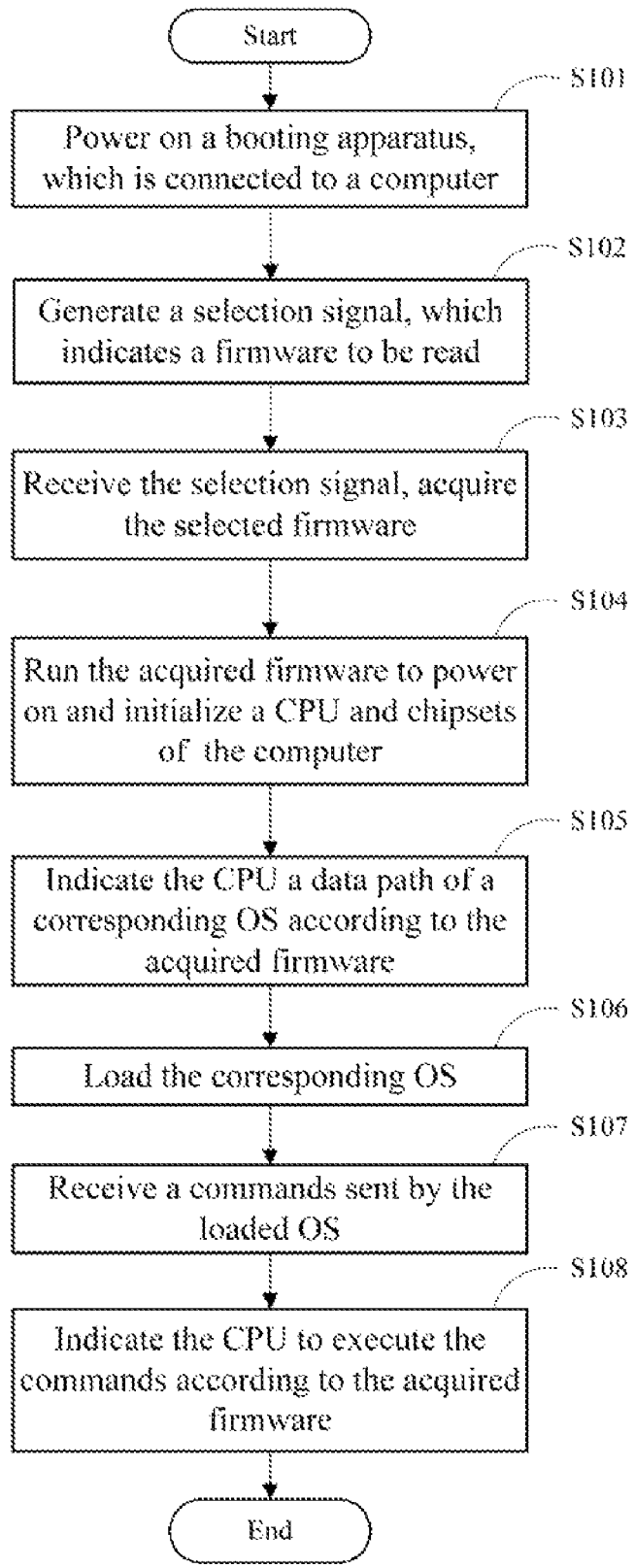
FIG. 2 is a flowchart of a preferred booting method by utilizing the apparatus of FIG. 1.

FIG. 2 is a flowchart of a preferred method for booting the second OS of the computer 100 of FIG. 1.

In step 101, the power management unit 16 powers on the booting apparatus 1 according to the operational inputs through the power button 17.

In step 102, the firmware selection module 123 generates the selection signal, which indicates whether the first firmware or the second firmware is to be read, according to the operational inputs through the input unit 15.

In step 103, the firmware acquiring module 122 receives the selection signal, and acquires the selected firmware according to the selection signal from the storage unit 13.

In step 104, the logic control module 121 runs the acquired firmware to power on and initialize the CPU 21 and the chipsets 26 of the computer 100.

In step 105, the logic control module 121 indicates the CPU 21 a data path of a corresponding OS according to the acquired firmware.

In step 106, the CPU 121 loads the corresponding OS.

In step 107, the logic control module 121 receives the commands sent by the loaded OS.

In step 108, the logic control module 121 indicates the CPU 21 to execute the commands according to the acquired firmware.

Therefore, by utilizing the booting apparatus 1, the computer 100 can be equipped with two or more operating systems each is developed based on independent hardware architecture, and users can conveniently boot the computer 100 so as to load a desired OS while starting the computer 100.

Although the present invention has been specifically described on the basis of preferred embodiments and preferred methods thereof, the invention is not to be construed as being limited thereto. Various changes or modifications may be made to the embodiment and method without departing from the scope and spirit of the invention.

What is claimed is:

1. A booting apparatus for booting a computer, which is equipped with a first OS and a second OS, wherein the first OS and the second OS are loaded by a first firmware and a second firmware respectively, the computer comprises a CPU, chipsets, and a system bus, the apparatus comprising:
   a bus interface for connecting to the system bus of the computer;
   a power management unit for powering on the booting apparatus;
   an input unit for receiving operational inputs; and
   a micro control unit (MCU), comprising:
      a firmware selection module for generating a selection signal that indicates whether the first firmware or the second firmware is to be read, according to the operational inputs through the input unit;
      a firmware acquiring module for acquiring the selected firmware according to the selection signal; and
      a logic control module for running the acquired firmware to power on and initialize the CPU and the chipsets of the computer, indicating the CPU a data path of a corresponding OS according to the acquired firmware, receiving commands sent by the loaded OS, and indicating the CPU to execute the received commands according to the acquired firmware.

2. The apparatus according to claim 1, wherein the first OS and the second OS are respectively designed and for optimally performing on a specific type of hardware architecture.

3. The apparatus according to claim 2, further comprising a storage unit for storing the second firmware.

4. The apparatus according to claim 3, further comprising an update interface for connecting to an external medium, and an update control module for updating the second firmware through the external medium.

5. A computer having a first OS and a second OS, comprising:
   a CPU, chipsets, a system bus, a first firmware and a second firmware, wherein the first firmware is for loading the first OS, and the second firmware is for loading the second OS; and
   a booting apparatus, comprising:
      a bus interface for connecting to the system bus;
      a power management unit for powering on the booting apparatus;
      an input unit for receiving operational inputs; and
      a micro control unit (MCU), comprising:
         a firmware selection module for generating a selection signal that indicates whether the first firmware or the second firmware is to be read according to the operational inputs through the input unit;
         a firmware acquiring module for acquiring the selected firmware according to the selection signal; and
         a logic control module for running the acquired firmware to power on and initialize the CPU and the chipsets of the computer, indicating the CPU a data path of a corresponding OS according to the acquired firmware, receiving commands sent by the loaded OS, and indicating the CPU to execute the received commands according to the acquired firmware.

6. The computer according to claim 5, wherein the first OS and the second OS are respectively designed and for optimally perform on a specific type of hardware architecture.

7. The computer according to claim 6, wherein the booting apparatus further comprises a storage unit for storing the second firmware.

8. The computer according to claim 7, further comprising an update interface for connecting to an external medium, and an update control module for updating the second firmware through the external medium.

9. A method for booting a computer, wherein the computer comprises a booting apparatus, the method comprising:
powering on the booting apparatus;
generating a selection signal that indicates whether a first firmware or a second firmware is to be read;
acquiring the selected firmware according to the selection signal;
running the acquired firmware to power on and initialize a CPU and chipsets of the computer;
indicating the CPU a data path of a corresponding OS according to the acquired firmware;
loading the corresponding OS;
receiving commands sent by the loaded OS; and
indicating the CPU to execute the commands according to the acquired firmware.

10. The method according to claim 9, wherein the first OS and the second OS are respectively designed for optimally performing on a specific type of hardware architecture.

11. The method according to claim 10, further comprising:
updating the second firmware.

* * * * *